(12) United States Patent
Giubbini

(10) Patent No.: US 8,102,277 B2
(45) Date of Patent: *Jan. 24, 2012

(54) METHOD AND SYSTEM FOR REMOTE UPDATES OF METERS FOR METERING THE CONSUMPTION OF ELECTRICITY, WATER OR GAS

(75) Inventor: Paolo Giubbini, Rome (IT)

(73) Assignee: Enel Distribuzione S.p.A., Rome (IT)

( * ) Notice: Subject to any disclaimer, the term of this patent is extended or adjusted under 35 U.S.C. 154(b) by 435 days.

This patent is subject to a terminal disclaimer.

(21) Appl. No.: 12/453,716

(22) Filed: May 20, 2009

(65) Prior Publication Data

US 2009/0278706 A1 Nov. 12, 2009

Related U.S. Application Data

(63) Continuation of application No. 10/564,746, filed as application No. PCT/EP03/07778 on Jul. 17, 2003, now abandoned.

(51) Int. Cl.
G08B 23/00 (2006.01)
(52) U.S. Cl. .......... 340/870.02; 340/870.03; 340/870.31
(58) Field of Classification Search ........... 340/870.02–870.03, 870.31
See application file for complete search history.

(56) References Cited

U.S. PATENT DOCUMENTS

| | | | |
|---|---|---|---|
| 5,892,758 | A | 4/1999 | Argyroudis |
| 5,896,097 | A | 4/1999 | Cardozo |
| 5,959,549 | A | 9/1999 | Synesiou et al. |
| 6,366,217 | B1 | 4/2002 | Cunningham et al. |
| 6,470,496 | B1 | 10/2002 | Kato et al. |
| 6,710,721 | B1 | 3/2004 | Holowick |
| 2002/0194527 | A1 | 12/2002 | Murai et al. |

FOREIGN PATENT DOCUMENTS

| | | |
|---|---|---|
| DE | 19906568 | 8/2000 |
| JP | 09-200241 | 7/1997 |
| JP | 2000-350185 | 12/2000 |
| JP | 2001-243581 | 9/2001 |
| JP | 2002-175193 | 6/2002 |
| WO | 01/74045 | 10/2001 |
| WO | WO 03/055031 | 7/2003 |

OTHER PUBLICATIONS

Translation of Chinese official action, Apr. 3, 2009, in corresponding Chinese Application No. 03827056.0.

(Continued)

*Primary Examiner* — Albert Wong
(74) *Attorney, Agent, or Firm* — Nixon & Vanderhye P.C.

(57) ABSTRACT

In a method and system of remote metering the consumption of utilities like electricity, water or gas, each of a plurality of remote meters (RM) measures a consumption and reports the measured-consumption to a concentrator (C). The concentrator (C) communicates with a plurality of remote meters (RM) in order to collect consumption data and perform tasks related to the administration of its associated remote meters (RM). Each remote meter (RM) has a host controller (MCM) and a program memory storing programs for execution by the host controller (MCM). In order to update some or all of the application programs running on the host controller (MCM) of the remote meters (RM), the concentrator (C) transmits program data to the remote meters (RM), and the remote meters (RM) receive the program data and update at least a portion of the program stored in the program memory in accordance with the received program data.

21 Claims, 9 Drawing Sheets

OTHER PUBLICATIONS

Summary of Japanese official action, Aug. 14, 2009, in corresponding Japanese Application No. 2005-507490.

International Search Report of PCT/EP03/07778 mailed Mar. 1, 2004.
Wikipedia, Computer Software (edited Jun. 24, 2003).
Wikipedia, Computer Software (edited Aug. 12, 2006).

METHOD AND SYSTEM FOR REMOTE UPDATES OF METERS FOR METERING THE CONSUMPTION OF ELECTRICITY, WATER OR GAS

This application is a continuation application of U.S. patent application Ser. No. 10/564,746, filed on Jan. 17, 2006, now abandoned which was the U.S. national phase of international application PCT/EP2003/007778, filed Jul. 17, 2003, which designated the U.S., the entire content of which is hereby incorporated herein by reference in this application.

The present invention relates to a method and a system for remote metering the consumption of utilities distributed through a distribution network, e.g. an electricity, water or gas distribution network, to a plurality of consumers. The present invention furthermore relates to a concentrator for collecting data regarding the consumption of utilities from a plurality of associated remote meters, as well as to a remote meter for measuring the consumption of utilities.

In a distribution network for distributing utilities like electricity, water or gas to a large number of consumers spread over a large geographical territory, the consumers are typically equipped with a meter for measuring the consumption of the utilities by the associated consumer. The measured consumption will then be the basis for billing the consumer or for any other accounting purposes. Today, there exist public distribution networks for utilities like electricity, water and gas which make these utilities available to consumers on a nation wide scale. At present, in the majority of the existing distribution networks, the meters located at customer premises must be read by a human operator at regular intervals, e.g. once per year. Reading the measured consumptions with the aid of human interaction has a lot of disadvantages, due to the fact that human resources are expensive and tend to make mistakes when repeatedly performing simple tasks like reading utility meters at a larger number of customer premises.

In order to alleviate problems and costs associated with the reading of the consumption data by human operators, systems have been envisaged for remote metering the consumption of utilities. Generally speaking, in a system for remote metering the consumption of utilities, concentrator devices are provided, each of which administrates a certain number of remote meters located at the customer premises. The remote meters report the measured consumption data to their associated concentrators. The concentrators in turn communicate with other, higher level concentration nodes or directly with centralized management facilities which will further process the collected consumption data, send bills out to the customers and perform other high level administrative tasks relating to the operation of the utility distribution network.

In such a system for remote metering the consumption of utilities, each of the concentrators communicates with a plurality of remote meters in order to collect the measured consumption data and perform tasks related to the administration of the remote meters associated with the concentrator. In order to accomplish the tasks of metering the consumption, reporting data to the concentrator, receiving commands from the concentrator and other activities, a remote meter has a host controller and a program memory for executing programs stored in the program memory.

In a system of this kind, a need may arise to update the programs running on the host controllers of the remote meters. The utility distribution network operator may desire to amend or extend customer services which require the support of the remote meter at the customer premises, or may simply want to update the software running on the host controllers of the remote meters for any other reason. Given the large number of customers typically served by a utility distribution network, a program software update for a large number of remote meters can be costly, laborious and time-consuming. Therefore, in a system for remote metering the consumption of utilities there exists a need to administrate the program software running on the host controllers of the remote meters in a more efficient manner. The present invention addresses this need.

To meet this need in a distribution network of the kind described above wherein each of a plurality of remote meters reports measured consumption data to a concentrator associated with said plurality of remote meters, according to an example embodiment, the concentrator can perform the operation of transmitting program data to at least one of the remote meters. At least one of the remote meters performs the operation of receiving the program data and updating at least a portion of the programs stored in its program memory in accordance with the received program data. The term program data comprises information defining a sequence of instructions stored in program memory to be performed by a processor when executing a program. Program data may comprise a complete program, program routine or just portions of a program or program routine in any binary representation. The term program memory relates to such kind of memory wherein program instructions to be performed by the processor are stored. The term comprises such kinds of memory which are dedicated to store program instructions only as well as such kinds of memory which store both program data and data needed or modified by the program.

A system is provided for remote metering the consumption of utilities distributed through a public distribution network to a plurality of consumers comprises at least one concentrator and a plurality of remote meters which are typically, but not necessarily, located at the customer premises. The at least one concentrator is adapted to communicate with the remote meters in order to collect consumption data and perform tasks related to the administration of its associated remote meters. Each of the remote meters has a host controller and a program memory for executing programs stored in the program memory. The concentrator and the remote meters are adapted to perform a method of remote metering wherein the concentrator transmits program data to at least one of the remote meters, and wherein at least one of the remote meters receives the program data and updates at least a portion of the programs in its program memory in accordance with the received program data.

Preferably, the concentrator selects at least one individual meter or group of meters among the plurality of its associated remote meters by transmitting at least one selection message addressed to said at least one individual meter or group of meters. Remote meters then perform the operation of receiving the program data and updating their program memory subject to the condition that they have been selected by the concentrator. In this way, a program software update may be performed selectively in remote meters which have been selected for a program update by the concentrator.

The transmission of program data from the concentrator to at least one of the remote meters preferably comprises transmitting a program update control message to the selected remote meters. This program update control message allows to individually configure the program software update procedure in the remote meter or meters addressed by the program update control message. The program update control message may indicate the time when the received program update should be loaded into the program memory. It may comprise a program digest which the remote meters can use to verify whether the program data have been received correctly and completely. The program update control message may contain control information regarding the start of the down load of the program data from the concentrator into the selected remote meters. The program update control message need not be a single, contiguous message but can comprise different messages transmitted at different time instants in accordance with the progress of the program down load procedure.

Advantageously, the program data are transmitted in the form of program data messages each comprising a portion of the program data to be downloaded into the remote meters. Each transmitted program data message may contain a message identifier which distinguishes the message from other program data messages. This is advantageous in that it allows to more efficiently retransmit such portions of the program data to be downloaded which got lost during the transmission. Preferably, the concentrator also transmits to the remote meter a message indicating the total number of program data messages into which the program data have been divided. The remote meter can then check whether all the program data messages have been received successfully and arrange by virtue of the respective message identifiers the received program data content in the proper order. In this way, there is no need for the concentrator to follow a prescribed sequence the transmission of program data messages or the retransmission of such program data messages which got lost on their way to the remote meter. Advantageously, program data messages are transmitted in broadcast or multicast mode. In a broadcast mode transmission, the transmitted message is not addressed to a particular destination meter, but may be received by any meter. In multicast mode, the transmitted message is addressed to a group of destination meters. All meters in that group are able to receive the multicast transmission.

The communication channel between the concentrator and its associated remote meters may be subject to various disturbances. Therefore, the concentrator advantageously queries each of the meters in a successive manner, whether all program data messages with the different portions of the program data have been received properly. If a queried meter reports missing or incorrectly received program data messages, the concentrator then retransmits in broadcast mode or multicast mode the program data messages which were reported by the queried meter to be incorrect or missing. In other words, the transmission in broadcast or multicast mode allows that not only the queried meter but also other remote meters can receive the retransmitted program data messages. In this way, each meter can receive those program data messages during the retransmission which the particular meter have incorrectly received or which are missing in that particular meter for other reasons. This keeps the volume of individual reports from the meters to the concentrators about missing or incorrect program data messages low, because all meters involved in the program update procedure can benefit from dedicated retransmissions of missing program data portions by the concentrator. Preferably, the concentrator repeats the operation of successively querying each of the meters involved in the program update procedure until all of the meters have reported the successful reception of all program data messages, or until an abort condition is satisfied. This abort condition may be a limit in the number of retransmissions for a particular meter, a time out condition or any other condition suitable for preventing dead locks in the program update procedure.

In order to further reduce the communication between the concentrator and the remote meters involved in the program update procedure, a meter that has successfully received all the program data messages preferably reports a download complete message to the concentrator. The concentrator then excludes meters from the successive queries from which a download complete message has been received.

The received program data are advantageously stored at first in a non-volatile buffer memory. This buffer memory allows to compile the received program data messages into a block of updated program data ready for transfer into the program memory of the remote meter. Because there are various factors which may adversely affect the correct reception of the program data messages or the transfer operation from the buffer memory into the program memory, it is advantageous to check, before a transfer into the program data memory is made, whether the program data stored in the buffer memory are correct. If the program data in the buffer memory are found to be correct, the program data can be copied from the buffer memory into the program memory. Preferably, the data in the program memory are then checked as to whether these copied data in the program memory are correct. If the copied data are found to be not correct, the copying step is repeated. This additional check takes account of the possibility that during the copying step from the non-volatile buffer memory into the preferably non-volatile program memory problems can occur e.g. due to a failure of the power supply for the remote meter.

The operation of updating programs in the program memory is advantageously performed by the host controller in the remote meter executing a program data swap routine stored in a non-volatile memory area of the program memory which is protected against any program data chance. Preferably, prior to copying data from the buffer memory into the program memory, a non-volatile flag is set. This flag is cleared if the copied data in the program memory are found to be correct. After a power failure the host controller will advantageously check whether this flag is set or not. If the flag is found to be set, the host controller of the remote meter will restart the operation of copying data from the buffer memory into the program memory and then check the correctness of the copied program data. In this way, the consistency of the copied program data can be maintained even if the copying operation is disturbed e.g. by a power failure of the remote meter.

Preferably, the concentrator communicates with the remote meters via power line communication wherein the electricity distribution network sections are used to carry the data transmission between the concentrator and the associated remote meters. The concentrator is preferably located in association with a secondary sub station of the electricity distribution network which transforms a medium voltage level of e.g. 20 kV into the low voltage level of e.g. 220V/230V to 240 V. The concentrator can then communicate with its associated remote meters via power line communication, also called distribution line communication, over the low voltage network section to which both the concentrator and its associated remote meters are connected. The concentrators in turn preferably communicate with the centralized management facilities or with higher level concentration nodes through a public telephone network, most preferably through a public radio telephone network like the GSM mobile telephone network.

In the following preferred embodiments will be described in detail with reference to the accompanying drawings.

Figure 1:
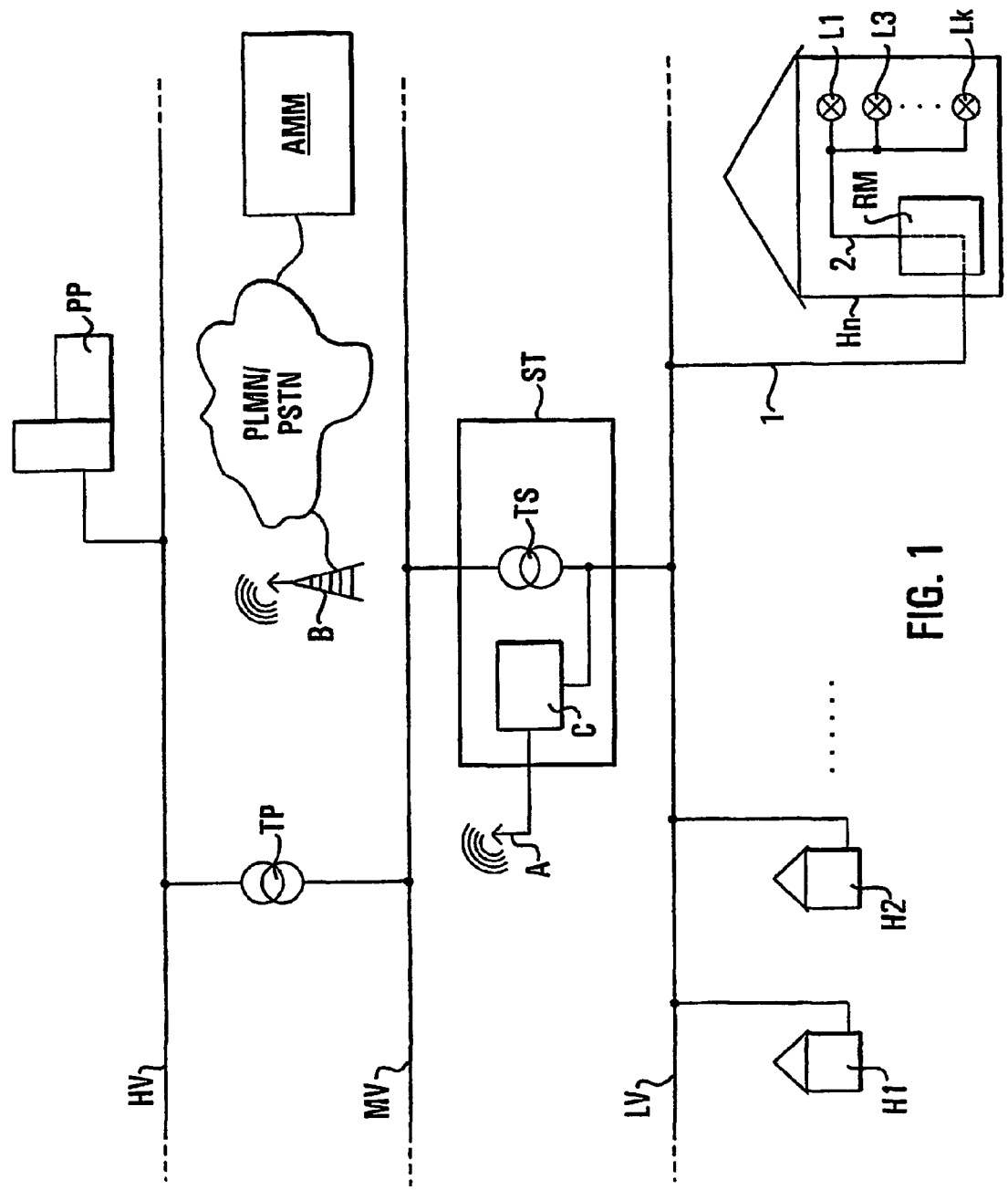
FIG. 1 shows an embodiment of a system for remote metering of the consumption of electricity in an electricity distribution network with a plurality of consumers.

FIG. 1 shows an embodiment of a system for remote metering the consumption of electricity in an electricity distribution network which comprises a high voltage network portion HV, a medium voltage network portion MV as well as a low voltage network portion LV. PP denotes a power plant which feeds electric power into the high voltage network portion HV for distribution over a large geographical area. TP denotes a primary substation which transforms the high voltage carried on the high voltage network portion into a medium voltage in order to feed a section of the medium voltage network portion MV. ST denotes a secondary substation which connects the medium voltage network portion MV with a network section 1 in the low voltage network portion LV. The secondary sub station ST comprises a secondary transformer TS which transforms the medium voltage of e.g. 20 kV into a low voltage of e.g. 220 V for distribution to a plurality of consumers H1, H2, . . . , Hn. Each consumer H1, . . . , Hn comprises a remote meter RM which is connected between the low voltage network section 1 and a power line 2 which distributes the electric energy at the customer premises to a plurality of electricity consumers L1, L2, . . . , Lk like lamps, washing machines, dish washers, television sets in case of domestic consumers or industrial facilities like machine tools in case of commercial consumers.

In the embodiment shown in FIG. 1, the secondary substation ST comprises a concentrator C located at the premises of the secondary sub station ST. The concentrator is connected to the low voltage network section fed by the secondary sub station ST in order to communicate with the remote meters RM at the customer premises H1, H2, . . . , Hn via power line communication using the low voltage network section 1 for the transmission of communication signals between the concentrator C and its associated remote meters RM. AMM denotes a centralized management facility for administrating a large number of consumers connected to the electricity distribution network shown in FIG. 1. This centralized management facility AMM gathers consumption data from the large number of consumers and performs activities like billing the consumers in accordance with the measured consumption reported by the remote meters RM at the customer premises H1, H2, . . . , Hn to the concentrator C. The concentrator C collects the reported consumption data from the remote meters, suitably processes and buffers the reported consumption data and transmits data relating to the reported consumption in a suitable format and at a suitable timing to the centralized management facility AMM. The AMM in return transmits commands, requests and other data to the concentrators in the network of FIG. 1 in order to control and administrate the operation of the concentrators C and the remote meters RM in the network. In the embodiment of FIG. 1, the communication between the concentrators C and the centralized management facilities AMM takes place through a public telecommunication network, which is most preferably a wireless or mobile telecommunication network like the GSM network. To this end, the concentrator C comprises a GSM modem device not shown in FIG. 1 which is connected to an antenna A. The modem communicates in a wireless fashion with a base station B which forms a part of the public mobile telephone network PSTN/PLMN in FIG. 1. The public telephone network PSTN/PLMN in turn is connected with the centralized management facilities AMM.

When operating a utility distribution network with remote metering facilities as shown in FIG. 1, the network operator will find himself confronted with the need to update programs running in the remote meters RM for performing the metering and reporting functions of the meters as well as other related tasks. Among the reasons for the need to perform a program update in the remote meters are changing tariff structures, the need to fix bugs in the programs running in the remote meters, or the desire to extend the functionality of the remote meters which is determined by the features of the program software running in the remote meters RM. In the system shown in FIG. 1, the concentrator C is, therefore, able to send program updates to some or all of the remote meters RM connected to the low voltage network section 1 associated with the concentrator C. The remote meters RM are able to receive the program updates and load the program data received from the concentrator C into their program memory in order to accomplish the program update.

Figure 2:
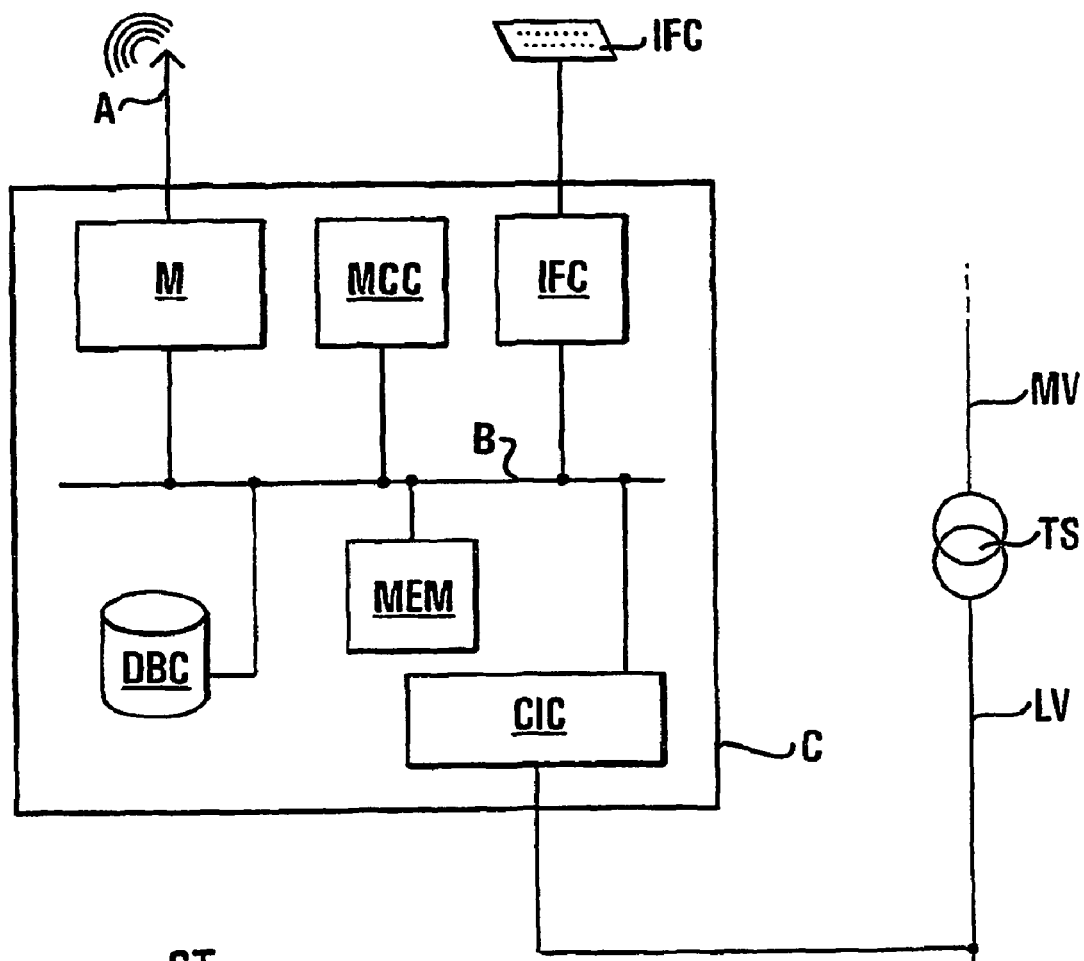
FIG. 2 shows an embodiment of a concentrator located at a secondary sub station of the network shown in FIG. 1.

FIG. 2 shows an embodiment of the concentrator C located at the secondary sub station ST of the network shown in FIG. 1. The concentrator C comprises a host controller, e.g. a micro controller MCC which is connected with a program memory MEM through a data bus B. DBC in FIG. 2 denotes a means for storing data collected by the concentrator from the associated remote meters as well as other data. The data storing means DBC may be implemented as a random access memory, a hard disc drive or any other suitable data storage device, e.g. a flash memory. The data storing means DBC is connected with the micro controller MCC of the concentrator at the program memory MEM through the data bus B. M in FIG. 2 denotes a GSM modem under control of the micro controller MCC through the data bus B. The GSM modem M is connected with the antenna A for wireless communication in a GSM network.

CIC in FIG. 2 denotes a communication interface of the concentrator C. The communication interface CIC serves to enable the concentrator C to communicate with its associated remote meters through the power line of the low voltage network section LV to which both the concentrator and its associated remote meters are connected. The communication interface CIC receives data from the data bus B under control of the micro controller MCC for transmission to some or all of the associated remote meters either in unicast or multicast or broadcast mode depending on the content of the message to be transmitted. If data from the concentrator are intended for transmission to a particular remote meter only (unicast mode), the data message transmitted through the communication interface CIC will contain a specific remote meter address. A message transmitted in multicast mode will contain the address of a group of remote meters which are intended to receive the particular multicast message. In broadcast mode, messages transmitted through the communication interface CIC will bear an identifier that they are broadcast messages intended to be received by any recipient, or they may simply not include a specific destination address. Of course, any kind of message protocol is suitable for implementing the CIC which includes the possibility to transmit messages in unicast and broadcast transmission modes. These functions of the communication interface CIC are performed under control of the micro controller MCC. The communication interface CIC takes the data to be transmitted from the data bus B and converts them into a physical signal suitable for transmission over the low voltage power lines. Moreover, the communication interface CIC also acts as a receiver interface for receiving power line communication signals from the remote meters which are addressed to the concentrator C. To this end, the communication interface CIC compares the address of messages sent by remote meters on the LV network section with its own address. If the communication interface CIC finds a message to be addressed to the concentrator C, it will receive the message from the LV network section and pass it on to the micro controller MCC and/or other components of the concentrator C for further processing. Messages not addressed to the concentrator C will be ignored by the communication interface CIC and not passed onto other components in the concentrator C.

In FIG. 2, the data storage means DBC may store program data to be downloaded by the concentrator C into some or all of its associated remote meters. The program data for updating the remote meters may have been received by the concentrator from the centralized management facilities AMM in FIG. 1 through the GSM modem M. In the alternative, the program data for download into some or all of the remote meters may have been supplied through an interface IFC of the concentrator which enables service personnel at the secondary sub station ST where the concentrator is located, to download data into the data storage means DBC. The interface IFC may be a conventional RS 232 or any other standardized interface or preferably, a wireless interface like an optical or blue tooth interface which allows the concentrator to communicate temporarily with e.g. a hand held device operated by service personnel.

While the concentrator according to the embodiment in FIG. 2 has an internal GSM modem M, it is of course possible to employ an external modem instead. In this case, a separate modem interface may be provided in the concentrator for connecting the external GSM modem, or the interface IFC may be used for this purpose.

Other elements in FIG. 2 which correspond to elements already described in connection with FIG. 1, have been denoted with the same reference numerals such that in this respect reference can be made to the description of FIG. 1.

Figure 3:
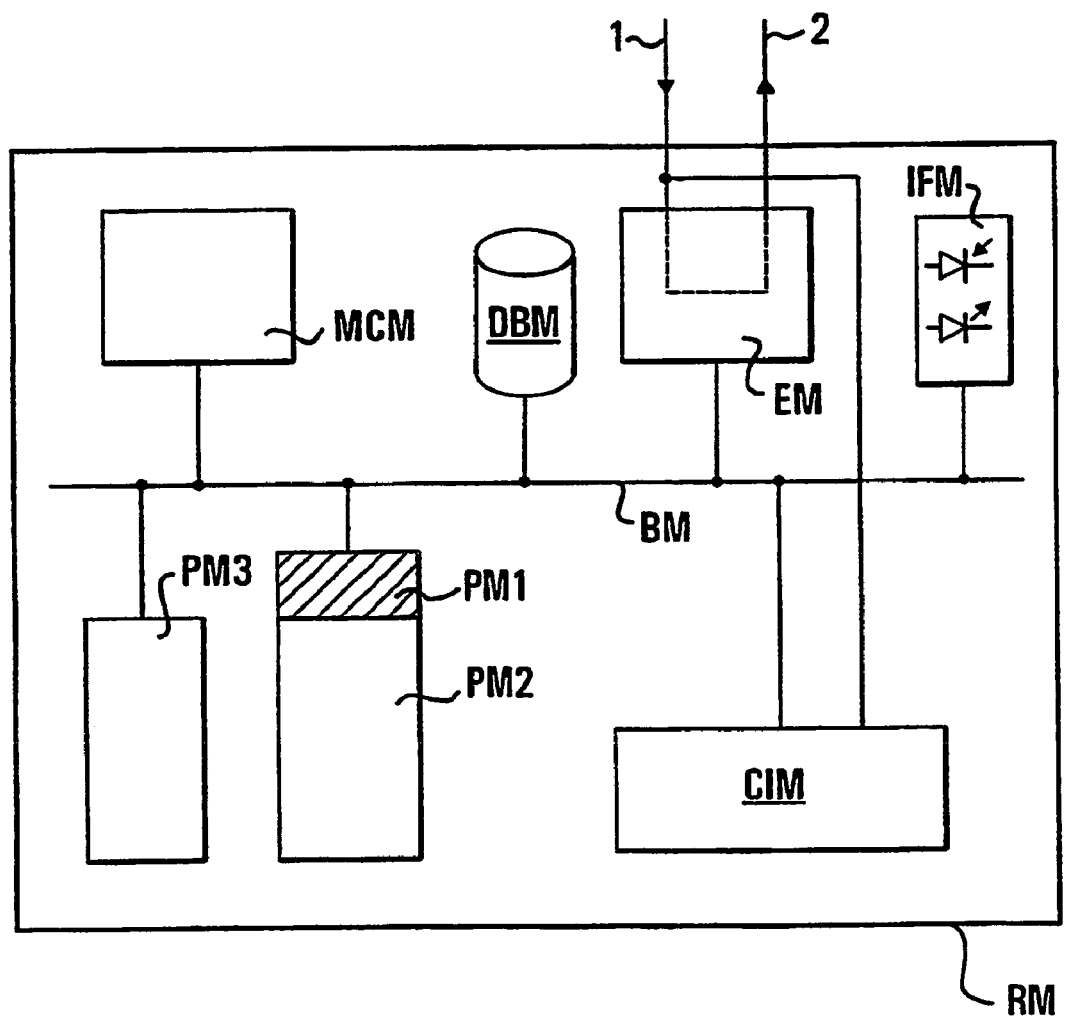
FIG. 3 shows an embodiment of a remote meter located at customer premises in the network of FIG. 1.

FIG. 3 shows an embodiment of a remote meter RM located inside or outside of customer premises in the network of FIG. 1. In FIG. 3, reference numeral 1 denotes a power line as a part of the low voltage network section. Power supplied through the power line 1 passes through an energy metering unit EM which counts the energy consumed by the electric loads L1, L2, ... shown in FIG. 1. In FIG. 3, MCM denotes a host controller of the remote meter, for example a micro controller. DBM denotes a data storage device, e.g. a random access memory. PM1 and PM2 denote program memories for storing a sequence of instructions to be executed by the micro controller MCM. The micro controller MCM, the program memory PM1, the program memory PM2, the data storage device DBM and the energy metering unit EM are connected with each other through a data bus BM. The program memory PM1 is a non-volatile memory which is protected against any change of its content. This program memory PM1 can e.g. be implemented using a mask programmed read only memory, without being limited to this particular implementation. This program memory PM1 stores basic routines required for starting the remote meter, as well as routine needed for updating the content of the program memory PM2 wherein application programs for the remote meter are stored. The application programs stored in the program memory PM2 are executed by the host controller MCM. They may be updated under control of the concentrator C associated with the remote meter RM, as will be explained in detail further below. Preferably, also the program memory PM2 is a non-volatile memory, e.g. a flash memory. PM3 denotes a buffer memory for storing program data received from the concentrator C. The buffer memory PM3 is controlled by the micro controller MCM through the common data bus BM. Program data stored in the program memory PM3 will not be executed by the micro controller MCM. Rather, the micro controller MCM has access to the program memory PM3 as a temporary storage facility for program data before loading them into the program memory area PM2 under control of programs stored in the program memory area PM1. Moreover, the micro controller MCM performs check routines on the content of the buffer program memory PM3 to analyse whether the data in the buffer program memory PM3 are consistent and ready for being copied into the program memory PM2, as will be explained in greater detail further below.

Preferably, the buffer program memory PM3 is a non-volatile ferro-electric random access memory (FRAM).

CIM denotes a power line communication interface of the remote meter RM. The communication interface CIM listens to data messages on the power line 1 and receives broadcast data messages or messages addressed to the remote meter. Such messages will be passed on by the communication interface CIM for further processing by the micro controller MCM and its associated peripherals. Data messages on the power line 1 not addressed to the remote meter will be ignored by the power line communication interface CIM. Messages generated by the remote meter RM are converted by the communication interface CIM into signals suitable for transmission over the power line 1. To perform these tasks, the communication interface CIM is connected to the common system bus BM of the remote meter RM and implements any suitable communication protocol in accordance with the communication protocol implemented in the concentrator C. In FIG. 3, IFM denotes a local interface, preferably an optical interface, in order to allow service personnel to interact with the remote meter RM if, for example the concentrator or the remote meter reports a problem concerning the remote meter which cannot be solved under remote control by the concentrator.

Figure 4:
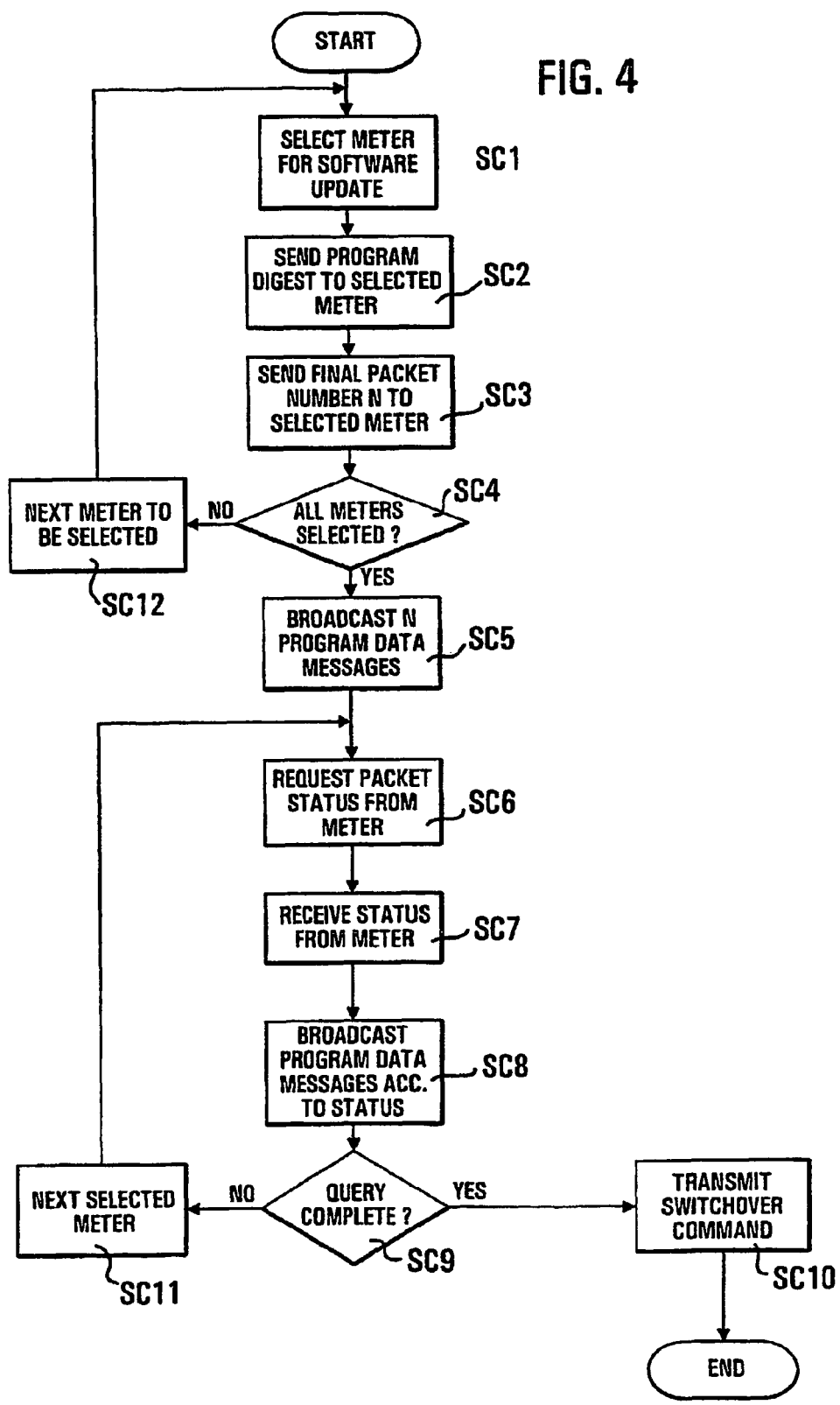
FIG. 4 shows a flow chart according to an embodiment for illustrating operations performed by a concentrator to update program data in a plurality of remote meters in the network of FIG. 1.

FIG. 4 shows a flow chart according to an embodiment of the present invention for illustrating operations performed by the concentrator in order to update program data in a plurality of remote meters in the network shown in FIG. 1. In FIG. 4, SC1 denotes an operation performed by the concentrator for selecting one or more of its associated meters for an update of the program software running in the remote meters. The concentrator selects meters for a program software update based on information available to the concentrator about the program version in the various remote meters or in accordance with customer specific information, e.g. if a particular customer or group of customers have subscribed to additional services, or in accordance with particular types of meters like single-phase/polyphase meters, or according to any other appropriate selection criteria. In the operation SC1, the concentrator C will send a unicast authenticated message to a selected meter to inform the meter about its selection for a program software update. In operation SC2, the concentrator then sends to the particular selected meter a program digest calculated by the concentrator from the program data to be transmitted to the meter in a way known to the meter. This program digest serves to enable the meter to check later at the end of the program data download process, whether the downloaded program data are authentic, correct and complete. In the operation SC3, the concentrator sends a total packet number N to the selected meter. The packet number N indicates the number of program data messages or packets into which the program data to be downloaded have been divided for transmission from the concentrator to the selected meters. The operation SC4 by the concentrator serves to check whether all meters selected for download have received the information according to the operations SC1 to SC3. If no, the operations SC1 to SC3 are performed for the next meter selected by the concentrator for download. If all meters have been informed about their selection for a program update and have received the program digest and final packet number N, then the concentrator proceeds to operation SC5 to broadcast N program data messages, each program data message carrying a portion of the program data to be downloaded into the selected meters.

The operation SC3 furthermore comprises transmitting a control word to the selected meter to command the meter to start the download process. Every meter which has received this download start command, will receive broadcast program data messages transmitted by the concentrator in the operation SC5 and store the received program data messages in the program memory buffer PM3, as will be explained further below.

After the concentrator has accomplished the operation SC5, the flow of operations proceeds to SC6 wherein the concentrator sends a unicast request to each selected meter to make the meter report its packet status, that is information concerning program data messages which the individual meter was unable to receive correctly. In the operation SC7, the concentrator receives such status report from the particular meter and then proceeds to the operation SC8 where the concentrator retransmits the program data messages in broadcast mode which were included in the status report from the meter in operation SC7 as missing or incorrect (corrupt). In the operation SC9 the concentrator then checks whether it has completed the query operations regarding all the meters selected for download. If the concentrator finds in SC9, that it has not yet queried all selected meters or that it has not received a download complete message from each selected meter, the concentrator proceeds to query or query again a next one of the selected meters by means of performing the operations SC6 to SC8 and SC9, as just described. In the operation SC7, if a meter has successfully received all the N program data messages, it will report that the download is complete. Meters that have reported download complete, will not be selected again for being queried in the operation SC11.

If the concentrator finds in the operation SC9 that all meters selected for download have reported a download complete or if an abort condition is satisfied, the concentrator proceeds to the operation SC10. The concentrator will abort the query loop of the operations SC6 to SC9 and SC11 for example if a meter has been queried for a predetermined number of times, each time without reporting a download complete message. In the operation SC10, the concentrator then transmits a switch over command to the selected meters to cause the meter to switch over from the old program software to the updated program software. This operation will be explained further below with reference to FIG. 8. The switch over command may comprise information about the time when each selected meter should perform the program update.

Figure 5:
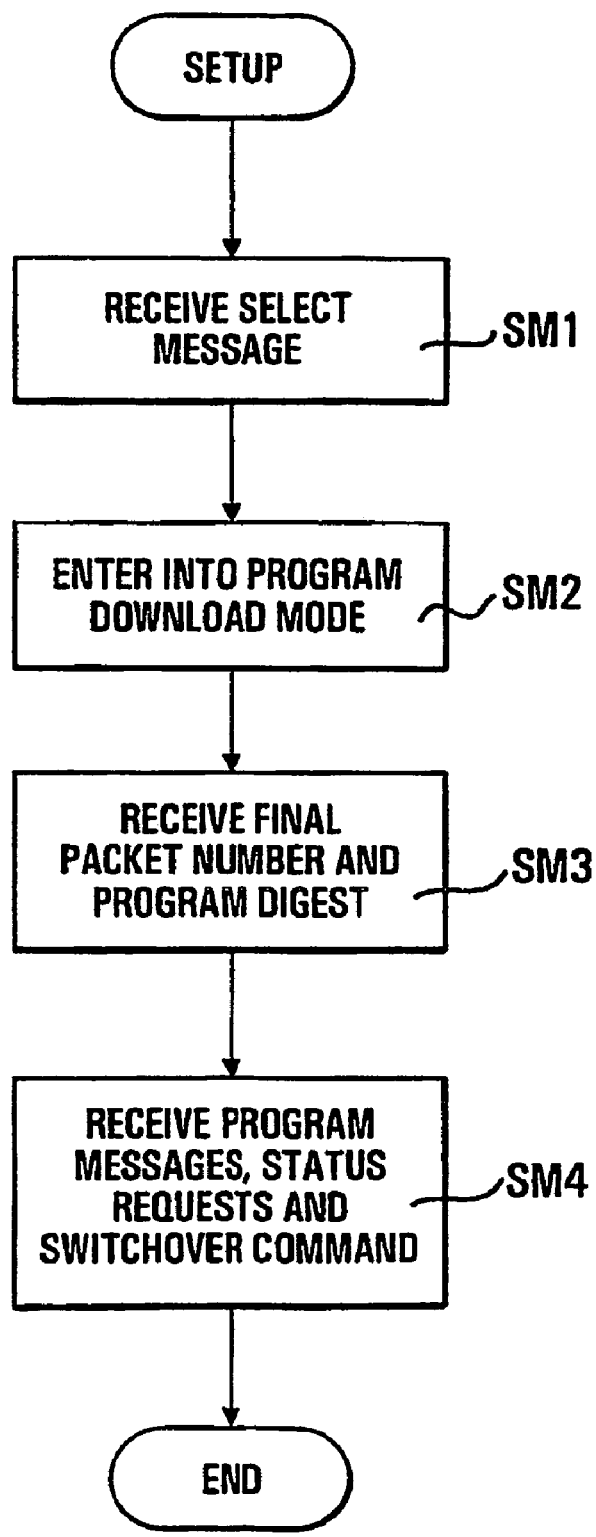
FIG. 5 shows a flow chart according to an embodiment to illustrate operations performed by a remote meter in response to a selection by the concentrator for a program software update.

FIG. 5 shows a flow chart according to an embodiment to illustrate operations performed by a remote meter in response to a selection by the concentrator for a program software update. If a remote meter receives a unicast selection message addressed to the particular meter SM1, the meter will enter into a program data download mode (operation SM2), and wait for a final packet number and a program digest from the concentrator in the operation SM3. After the remote meter has received the final packet number N, the program digest as well as a download start command from the concentrator, the meter proceeds to the operation SM4 to receive the broadcast program data messages as well as status requests from the concentrator. In the operation SM4, the remote meter will store program data messages received from the concentrator in the program memory buffer PM1. It will respond to status requests from the concentrator either with a download complete message, if the meter found in the operation SM4 that it has correctly received all the N program data messages from the concentrator or it will report to the concentrator which of the N program data messages are still missing in its program memory buffer PM1 as will be explained further below with reference to FIG. 6. Moreover, in the operation SM4 the remote meter will perform a switch over function in response to receiving a switch over command from the concentrator in order to update the program memory PM2, as will be explained further below with reference to FIG. 8. After completion of the operation SM4, the remote meter will leave the program download mode.

Figure 6:
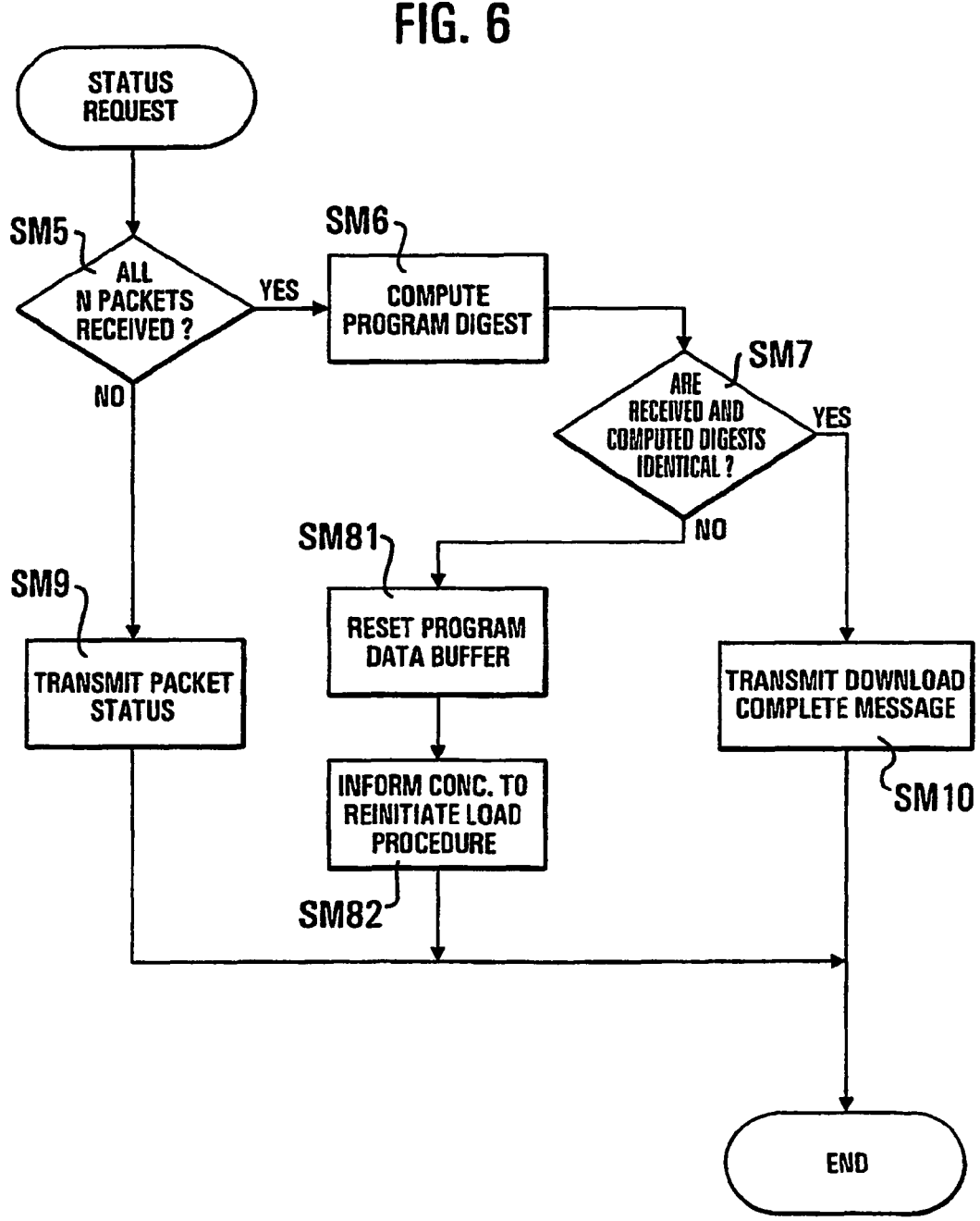
FIG. 6 is a flow chart according to an embodiment for illustrating operations performed by a remote meter in response to a status request from the concentrator.

FIG. 6 is a flow chart according to an embodiment for illustrating operations in greater detail which are performed by the remote meter in response to a status request from the concentrator. In response to a status request, the remote meters checks in step SM5 whether it has successfully received all the N program data messages (packets) into which the program data to be downloaded have been apportioned by the concentrator. In the affirmative case, the remote meter proceeds to the operation SM6 in order to compute the program digest based on the N program data messages it has received. In SM7 the remote meter then checks whether the program digest computed by the remote meter in the operation SM6 and the program digest transmitted by the concentrator in the operation SC2 (see FIG. 4) are identical. If YES, the program data has been downloaded successfully into the remote meter, and the meter proceeds to the operation SM10 to transmit a download complete message to the concentrator. If in the operation SM7 the remote meter finds the computed program digest to be not identical with the program digest received from the concentrator, then the remote meter proceeds to the operation SM81 and resets the program data buffer PM1. Then, in the operation SM82 the remote meter informs the concentrator in response to the status request, to reinitiate the load procedure for that particular selected meter.

If the remote meter finds in the operation SM5 that it has not yet received all the N program data messages (packets), it analyses in the operation SM9 which of the N program data messages are still missing. Each program data message comprises a packet identifier which allows the remote meter to reassemble the received data messages in the correct order and to identify such packets which are still missing. The meter then transmits a corresponding status report about the missing program data messages to the concentrator.

Figure 7:
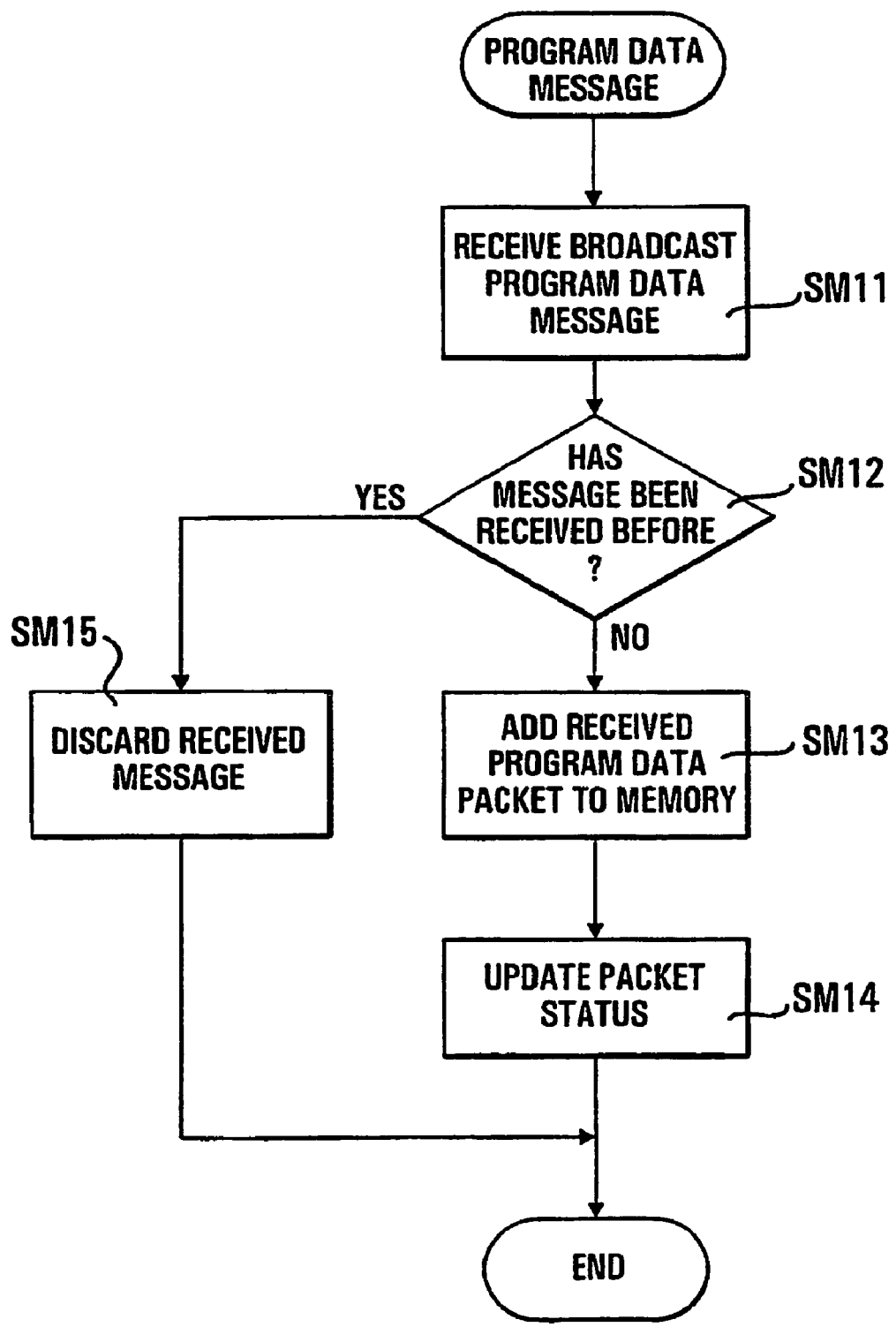
FIG. 7 is a flow chart according to an embodiment to illustrate operations performed by the remote meter in response to receiving a broadcast program data message.

FIG. 7 is a flow chart according to an embodiment to illustrate operations performed by a selected remote meter when a broadcast program data message arrives. In the operation SM11 of FIG. 7 the remote meter analyses whether a message arriving at the remote meter is a broadcast program data message. The remote meter will receive broadcast program data messages and then check in the operation SM12 whether that particular received program data message has already been received before by the remote meter. If the received program data message has been received and stored before in the program buffer memory PM1, the flow proceeds to the operation SM15 to discard the message just received. If the remote meters finds in the operation SM12, that the program data message just received has not been received and stored before, the flow proceeds to the operation SM13 where the remote meter adds the received program data packet carried in the program data message to the program buffer memory PM1. The flow then proceeds to the operation SM14, wherein the remote meter updates a packet status field using the packet identifier to keep track of all program data packets that have been received successfully. This packet status field is used by the remote meter in the operation SM5 in FIG. 6 when checking whether all the N program data packets have been received.

According to the embodiment shown and as explained in connection with the FIGS. 6 and 7, the check in SM 5 as to whether all packets have been received, is performed in response to a status request from the concentrator. This status request may also initiate the calculation of the program digest and the generation of messages to the concentrator to inform the concentrator about the packet status (SM9) or about a completed download (SM 10) or about the necessity to re-initiate the download procedure (SM82). According to an alternative embodiment, the check of SM5 whether all N program data packets have been received, and in the affirmative the subsequent operations SM6, SM7 to SM 81, SM82 or SM10, can be executed e.g. following the operation SM14 in FIG. 7. The download complete information of operation SM10 may be transmitted instantaneously to the concentrator or it may be stored by the remote meter in memory in a control word. Similarly, the information of operation SM82 that the load procedure has to be re-initiated, may be transmitted instantaneously or it may be stored in the control word. The remote meter then makes this information available to the concentrator upon a control word read command from the concentrator.

Figure 8:
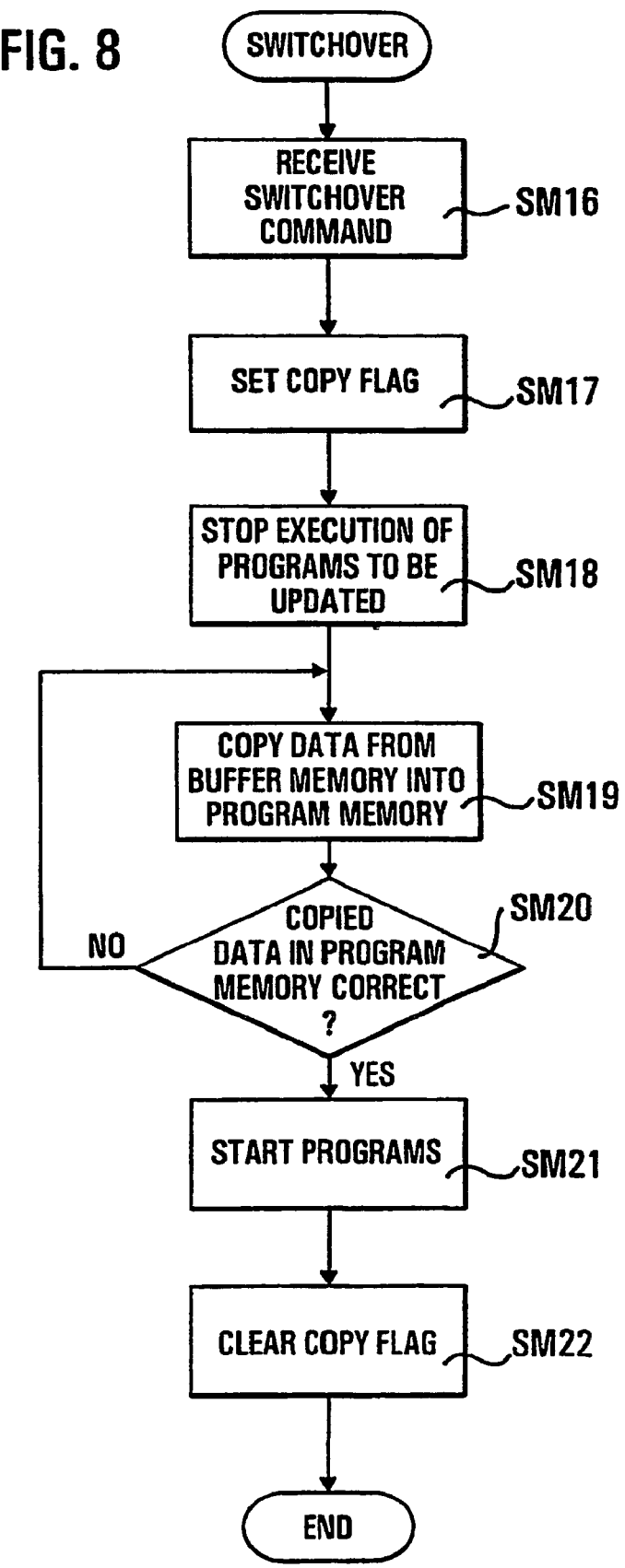
FIG. 8 is a flow chart according to an embodiment to illustrate operations performed by a remote meter in response to receiving a switch over command.

FIG. 8 is a flow chart according to an embodiment to illustrate operations performed by a remote meter in response to receiving a unicast authenticated switch over command from the concentrator in the operation SM16. After the remote meter has established in the operation SM16 that the switch over command from the concentrator is addressed to this particular meter and is an authentic switch over command, the remote meter proceeds to the operation SM17 to set a copy flag in non-volatile memory to prepare for copying program data from the program buffer memory PM 1 into the program memory PM2 of the remote meter. The copy flag indicates that a program data copying operation from the memory PM3 to memory PM2 is pending and that the content of PM2 is presently not suitable for execution by the host controller of the remote meter. After the copy flag has been set, the remote meter proceeds to the operation SM18 wherein the execution of programs to be updated in the program memory PM2 is terminated. Then, the remote meter performs the operation SM19 of copying program data from the program buffer memory PM3 into the program memory PM2. This operation of copying data is performed under control of program routines stored in the protected program memory PM1 of the remote meter. This protected program memory will not suffer from corruptions even if the micro controller MCM erroneously attempts to write to memory locations in the protected program memory PM1. Under control of program routines stored in the protected program memory PM1, the flow then proceeds to the operation SM20 where the remote meter checks whether the data in the program buffer memory PM3 has been correctly copied into the program memory PM2. If this is the case, then the remote meter restarts the programs stored in the program memory PM2 (operation SM21) and clears the copy flag in the operation SM22, indicating that a program data copying operation is no longer pending. On the other hand, if in SM20 it has been found that an error has occurred in copying the data from the program buffer memory PM3 into the program memory PM2, then the flow of operations goes back to the operation SM19 in order to repeat the operation of copying the program buffer memory PM3 into the program memory PM2.

Figure 9:
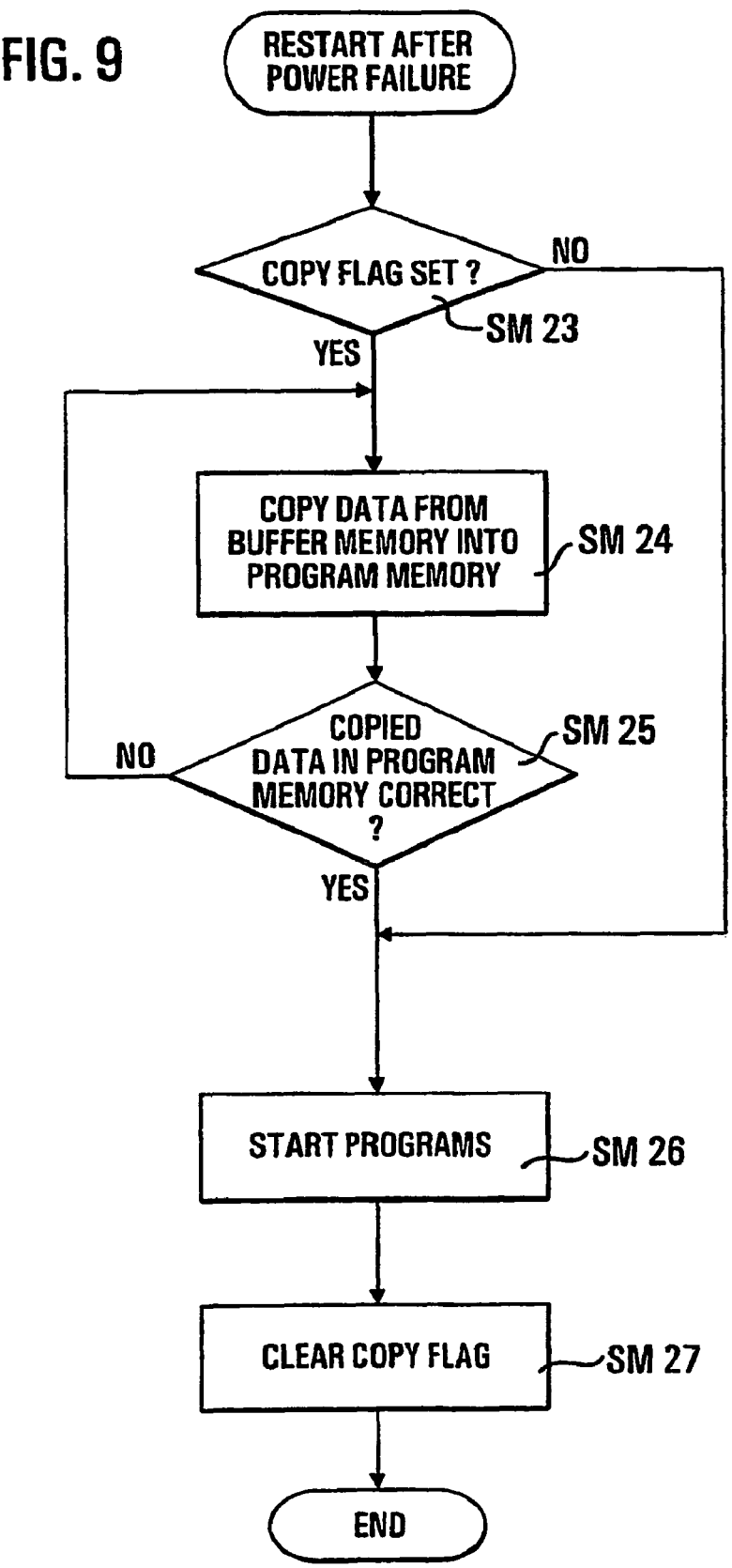
FIG. 9 is a flow chart according to an embodiment to illustrate operations performed by a remote meter after a power failure has occurred.

FIG. 9 is a flow chart according to an embodiment to illustrate operations performed by a remote meter after a power failure or any other serious event requiring a reset of the host controller of the remote meter has occurred. The operations in FIG. 9 serve to re-establish or maintain the consistency of data in the program memory PM2 of the remote meter even if the program data copy operation is disturbed by such a serious event. If a restart of the remote meter is required for any reason, e.g. due to a power failure, the meter checks in the operation SM23 whether the copy flag in non-volatile memory of the remote meter is set. If the copy flag is found to be set in the operation SM23, this is an indication that at the time when the serious even occurred, a program data copy operation was pending. In this case, the flow proceeds to the operation SM24 in order to repeat the program data copying operation from the beginning. This operation serves to ascertain that there are no corrupted data left in the program memory PM2 due to the occurrence of the serious event. Then, in operation SM25 the remote meter checks whether the program data copied into the program memory PM2 have been copied correctly. If No, the remote meter repeats the operation SM24 to achieve that the non-volatile program buffer memory PM3 has been copied completely and correctly into the program memory PM2. If in SM25 it is found that the program data has been copied correctly, in the operation SM26 the execution of the programs in the program memory PM2 is started, and in the operation SM27 the copy flag is cleared. If it is found in SM23 after a restart, that the copy flag is not set in the non-volatile memory, the operations SM24 and SM25 are skipped.

In the embodiments described above, the operations SM2 to SM20 are preferably implemented by means of software routines stored in the protected non-volatile memory area PM1 of the remote meter. These software routines are not available for a program update and protected against any inadvertent write access by the micro controller MCM. This serves to make sure that even if a serious fault occurs during a program update procedure, there remains a backbone of software routines which are uncorruptible and which will allow the remote meter to restart in any case, in order to re-establish a running version of application programs in the program memory PM2. According to the embodiments described above, the operation of copying program data from the program buffer memory PM3 into the program memory PM2 will be performed only if the data downloaded from the concentrator into the buffer PM3 have been found to be correct. Only if after copying the program data from PM3 into PM2 it has been found that the copying operation was successful, the micro controller MCM will start the programs stored in PM2. These operations are performed under control of the incorruptible program memory PM1 which stores the software routines for performing these program update control operations.

The invention claimed is:

1. A method of remote metering consumption of utilities distributed to a plurality of consumers, each consumer being associated with at least one remote meter, wherein:
- each remote meter measures a consumption and reports the measured consumption to a concentrator associated with a plurality of remote meters;
- the concentrator communicates with the plurality of remote meters associated with the concentrator in order to collect consumption data and to perform tasks related to the administration of the associated remote meters;
- each remote meter includes a host controller and a program memory, the host controller executing programs stored in the program memory;
- the concentrator transmits program data including information defining a sequence of program instructions to at least one of the plurality of remote meters associated with the concentrator, the concentrator successively transmitting program data messages, each program data message including a portion of the program data;
- each remote meter receives the program data;
- the concentrator queries each associated meter whether the queried meter has received the successively-transmitted program data messages including different portions of the program data; and
- if a queried meter reports one or more missing or incorrectly received program data messages, then the concentrator retransmits in a broadcast mode the one or more program data messages reported by the queried meter to be incorrect or missing;
- each associated meter receives those one or more program data messages during the retransmission which the respective meter has missed or incorrectly received; and
- each associated meter updates at least a portion of the programs stored in the program memory in accordance with the received program data.

2. The method according to claim 1, wherein the concentrator selects at least one individual meter or group of meters among the plurality of associated remote meters by transmitting at least one selection message addressed to the at least one individual meter or group of meters,
- wherein each associated remote meter receives the program data and updates the program memory subject to the condition that the associated remote meter has been selected by the concentrator.

3. The method according to claim 1, wherein the concentrator transmits a program update control message; and
- wherein each associated remote meter updates the program stored in the program memory in accordance with the received program update control message.

4. The method according to claim 1, wherein the program update control message comprises control information relating to an update time and/or a program digest and/or a download start command.

5. The method according to claim 1, wherein each transmitted program data message contains a message identifier which distinguishes the message from other program data messages.

6. The method according to claim 5, wherein:
- the concentrator transmits to the at least one remote associated meter a message indicating a number N of program data messages;
- wherein receiving the program data includes:
  - checking whether all the N program data messages have been received successfully; and
  - if all the N program data messages have been received successfully, arranging the program data content of the N messages in accordance with the respective identifiers n of each message and/or calculating a program digest from the received program data messages.

7. The method according to claim 1, further comprising:
- the concentrator repeating the successive querying of each of the associated meters until all of the associated meters have reported successful reception of all program data messages into which the program data are divided, or until an abort condition is satisfied.

8. The method according to claim 7, further comprising:
- if a meter successfully receives all of the program data messages, the associated meter reporting a download complete message to the concentrator; and
- the concentrator excluding from the successive queries meters from which a download complete message has been received.

9. The method according to claim 8, wherein the download complete message is reported in response to a query by the concentrator.

10. The method according to claim 1, wherein the receiving program data comprises storing the program data in a buffer memory.

11. The method according to claim 10, wherein the updating the program stored in the program memory comprises:
- checking whether the program data stored in the buffer memory are correct;
- if the program data in the buffer memory are correct, copying the program data stored in the buffer memory into the program memory;
- checking whether the copied data in the program memory are correct; and
- if the copied data are found to be not correct, again copying the program data stored in the buffer memory into the program memory.

12. The method according to claim 10, wherein the updating at least a portion of the programs stored in the program memory is performed by the host controller executing a program data swap routine stored in a non volatile memory area protected against any program data change.

13. The method according to claim 12, comprising:
- setting a flag prior to copying data from the buffer memory into the program memory; and
- clearing the flag if the copied data in the program memory are found to be correct.

14. The method according to claim 12, wherein the host controller:
- checks the flag after a power failure; and
- if the flag is set, restarts the copying of data from the buffer memory into the program memory and checking the correctness of the copied data.

15. The method according to claim 1, wherein the utilities are electricity, water, or gas.

16. A system for remote metering consumption of utilities distributed to a plurality of consumers, the system comprising:
- at least one concentrator and a plurality of remote meters located inside or outside of consumer premises,
- the at least one concentrator being arranged to communicate with remote meters associated with the at least one concentrator in order to collect consumption data and perform tasks related to administration of the associated remote meters;
- each remote meter having a host controller and a program memory for executing programs stored in the program memory; and the concentrator and the associated remote meters being arranged to perform a method of remote metering in accordance with claim 1.

17. A concentrator for collecting data regarding the consumption of utilities from a plurality of associated remote meters, each associated remote meter having a host controller and a program memory for storing a program to be executed by the host controller of the remote meter, the concentrator comprising:
- a communication interface for communicating with the plurality of associated remote meters;
- a microcontroller for processing data received from the associated remote meters through the communication interface;
- the microcontroller being programmed to transmit program data including information defining a sequence of program instructions to at least one of the associated remote meters for updating at least a portion of the programs stored in the program memory of the at least one associated remote meter;

wherein the concentrator is arranged to:
- transmit the program data by successively transmitting program data messages, each successive program data message including a portion of the program data,
- successively query whether each associated remote meter has received the successively-transmitted program data messages including different portions of the program data; and
- if a queried remote meter reports one or more missing or incorrectly received program data messages, retransmit in a broadcast mode to the associated remote meters the one or more program data messages reported by the queried remote meter to be incorrect or missing.

18. The concentrator according to claim 17, further arranged to repeat the successive querying of each of the associated remote meters until all of the queried remote meters have reported successful reception of all program data messages into which the program data are divided, or until an abort condition is satisfied.

19. The concentrator according to claim 18, further arranged to exclude from the successive queries a remote meter from which a download complete message has been received.

20. A remote meter for measuring the consumption of utilities, comprising:
- a communication interface for transmitting data concerning the measured consumption of utilities to a concentrator;
- a host controller and a program memory, the host controller being arranged to execute programs stored in the program memory relating to measuring of the consumption of the utilities and administration of the remote meter;

wherein the remote meter is arranged to:
- receive program data including information defining a sequence of program instructions transmitted in the form of program data messages, each program data message including a portion of the program data from the concentrator through the communication interface,
- receive a query from the concentrator whether the remote meter has received the successively-transmitted program data messages including different portions of the program data;
- send a report to the concentrator when one or more of the program data messages is missing or incorrectly received;
- receive a broadcast from the concentrator with one or more program data messages reported by the remote meter or at least one other report meter to be incorrect or missing; and
- update at least a portion of the programs stored in the program memory in accordance with the received program data.

21. The remote meter according to claim 20, further arranged to report a download complete message to the concentrator if the remote meter has successfully received all of the program data messages.

* * * * *